(12) United States Patent
Strasman et al.

(10) Patent No.: US 8,953,646 B2
(45) Date of Patent: *Feb. 10, 2015

(54) METHOD AND APPARATUS OF MULTIPLEXING MEDIA STREAMS

(75) Inventors: Nery Strasman, Ramat Gan (IL); Amit Esbet, Haifa (IL); Oren Reches, Zoran (IL)

(73) Assignee: ARRIS Solutions, Inc., Suwanee, GA (US)

(*) Notice: Subject to any disclaimer, the term of this patent is extended or adjusted under 35 U.S.C. 154(b) by 135 days.

This patent is subject to a terminal disclaimer.

(21) Appl. No.: 13/270,877

(22) Filed: Oct. 11, 2011

(65) Prior Publication Data

US 2012/0120968 A1    May 17, 2012

Related U.S. Application Data

(63) Continuation of application No. 10/693,509, filed on Oct. 24, 2003, now Pat. No. 8,036,250.

(60) Provisional application No. 60/421,247, filed on Oct. 25, 2002.

(51) Int. Cl.
*H04J 3/04* (2006.01)
*H04L 9/00* (2006.01)
*H04N 7/12* (2006.01)
*H04K 1/10* (2006.01)
*H04L 9/06* (2006.01)
*G11B 20/00* (2006.01)
*G06F 21/62* (2013.01)

(52) U.S. Cl.
CPC ............ *H04L 9/065* (2013.01); *G11B 20/0021* (2013.01); *G06F 21/6209* (2013.01); *H04N 21/23427* (2013.01)

USPC .......... 370/535; 370/236; 370/401; 370/443; 370/465; 370/538; 380/37; 380/42; 375/240.01; 713/178; 713/189

(58) Field of Classification Search
CPC .............. H04N 21/23476; H04N 2005/91364; H04N 21/631; H04N 5/913; H04N 7/1675; H04N 21/234327; H04N 21/440227; H04N 21/23655; H04N 21/4334; H04N 21/4408; H04L 2209/34; H04L 2209/601; H04L 9/065; H04L 2209/60; H04L 9/00; H04K 1/06; H04K 1/10; G06F 21/10; G06F 21/6209; G06F 21/78; G11B 20/00086; G11B 20/00507; G11B 20/0021
USPC .......................... 370/228–538; 713/168–194; 725/14–134; 380/33–42

See application file for complete search history.

(56) References Cited

U.S. PATENT DOCUMENTS 5,461,619 A    10/1995   Citta et al.
5,940,395 A    8/1999    Fraenkel et al.
5,966,448 A    10/1999   Namba et al.

(Continued)

*Primary Examiner* — Venkatesh Haliyur
(74) *Attorney, Agent, or Firm* — Troy A. Van Aacken

(57) ABSTRACT

An apparatus and method for generating a multiplex of media streams, the method includes the steps of: (i) receiving a set of media streams that comprises first type media stream components and second type media stream components; (ii) applying a modification process that is not adapted to modify second type media stream components, such as to provide at least one modified first type media stream component; and (iii) multiplexing at least the second type media stream components and the modified first type media stream components.

19 Claims, 7 Drawing Sheets

(56) References Cited

U.S. PATENT DOCUMENTS

| | | | |
|---|---|---|---|
| 6,118,786 A | 9/2000 | Tiernan et al. | |
| 6,404,746 B1 | 6/2002 | Cave et al. | |
| 6,421,359 B1 * | 7/2002 | Bennett et al. | 370/538 |
| 6,438,139 B1 | 8/2002 | Huang et al. | |
| 6,483,543 B1 | 11/2002 | Zhang et al. | |
| 6,516,002 B1 | 2/2003 | Huang et al. | |
| 6,769,127 B1 | 7/2004 | Bonomi et al. | |
| 6,782,550 B1 | 8/2004 | Cao | |
| 6,795,506 B1 | 9/2004 | Zhang et al. | |
| 6,831,892 B2 | 12/2004 | Robinett et al. | |
| 6,879,634 B1 | 4/2005 | Oz et al. | |
| 6,891,854 B2 * | 5/2005 | Zhang et al. | 370/468 |
| 6,894,987 B1 | 5/2005 | Andersen et al. | |
| 6,914,637 B1 | 7/2005 | Wolf et al. | |
| 6,937,619 B1 | 8/2005 | Strasman et al. | |
| 7,016,337 B1 | 3/2006 | Wu et al. | |
| 7,047,196 B2 | 5/2006 | Calderone et al. | |
| 7,075,924 B2 | 7/2006 | Richter et al. | |
| 7,116,717 B1 | 10/2006 | Eshet et al. | |
| 7,146,507 B2 * | 12/2006 | Shindo et al. | 713/189 |
| 7,165,175 B1 | 1/2007 | Kollmyer et al. | |
| 7,200,868 B2 * | 4/2007 | Mattox et al. | 726/26 |
| 7,283,519 B2 * | 10/2007 | Girard | 370/353 |
| 7,356,147 B2 | 4/2008 | Foster et al. | |
| 7,379,475 B2 | 5/2008 | Minami et al. | |
| 7,508,940 B2 * | 3/2009 | Kato et al. | 380/200 |
| 7,558,954 B2 | 7/2009 | Apostolopoulos et al. | |
| 7,583,612 B2 * | 9/2009 | Lin | 370/252 |
| 7,817,672 B2 * | 10/2010 | Oz et al. | 370/486 |
| 8,000,475 B1 * | 8/2011 | Guman | 380/212 |
| 8,036,250 B1 * | 10/2011 | Strasman et al. | 370/535 |
| 2002/0080267 A1 | 6/2002 | Moluf | |
| 2002/0114462 A1 | 8/2002 | Kudo et al. | |
| 2002/0150244 A1 * | 10/2002 | Kim et al. | 380/201 |
| 2003/0065925 A1 * | 4/2003 | Shindo et al. | 713/178 |
| 2003/0086568 A1 * | 5/2003 | Kato et al. | 380/201 |
| 2003/0206558 A1 * | 11/2003 | Parkkinen et al. | 370/477 |
| 2004/0017831 A1 * | 1/2004 | Shen et al. | 370/486 |
| 2004/0139313 A1 | 7/2004 | Buer et al. | |
| 2006/0034341 A1 | 2/2006 | Vasudevan et al. | |
| 2006/0034458 A1 * | 2/2006 | Kim et al. | 380/201 |
| 2006/0039565 A1 * | 2/2006 | Kim et al. | 380/277 |
| 2006/0244840 A1 | 11/2006 | Eshet et al. | |
| 2006/0271948 A1 | 11/2006 | Oz et al. | |
| 2006/0277581 A1 | 12/2006 | Eliyahu et al. | |
| 2007/0009232 A1 | 1/2007 | Muraki et al. | |
| 2007/0016802 A1 | 1/2007 | Wingert et al. | |
| 2007/0177632 A1 * | 8/2007 | Oz et al. | 370/486 |
| 2007/0206671 A1 | 9/2007 | Eshet et al. | |
| 2008/0240230 A1 | 10/2008 | Oxman et al. | |
| 2010/0017815 A1 | 1/2010 | Ivars et al. | |
| 2012/0120968 A1 * | 5/2012 | Strasman et al. | 370/465 |

* cited by examiner

METHOD AND APPARATUS OF MULTIPLEXING MEDIA STREAMS

RELATED APPLICATIONS

This application claims the priority of U.S. provisional application No. 60/421,247, entitled "Statistical Muxing of MPEG streams using partial encryption", filed 25 Oct. 2002.

BACKGROUND

Compression of Media Streams

Methods and apparatuses for compressing and transmitting media signals are known in the art. Compressed digital video is largely becoming the preferred medium to transmit to video viewers everywhere.

Part of the Moving Pictures Experts Group (MPEG) specifications are standardized methods for compressing and transmitting video. Various audio compression techniques are also known in the art. In general, MPEG is used today for transmitting video over terrestrial, wireless, satellite and cable communication channels and also for storing digital video. MPEG includes many compression schemes including MPEG-2, MPEG-4, MPEG-7.

An audio stream is organized as an ordered sequence of frames. A video stream is usually organized as an ordered sequence of frames, each frame includes a plurality of pixels. A video frame includes a plurality of slices, each slice including a plurality of macro blocks. The audio and video streams are provided to an audio encoder and video encoder respectively to generate compressed audio and video elementary streams, also referred to as elementary streams.

MPEG compression/encoding utilizes various compression schemes, such as adaptive quantization, intra-frame encoding, inter-frame encoding, run length encoding and variable length coding. Intra-frame coding takes advantage of spatial redundancies in a picture. Inter-frame coding takes advantage of temporal redundancies from picture to picture in a video sequence. Inter-frame coding involves motion estimation and motion compensation. There are three types of motion estimations—forward, backward and bi-directional. MPEG-2 defines macroblocks are the elementary unit for motion compensation and adaptive quantization. Each macroblock is associated with a quantization factor field (Q scale), representative of the degree of quantization. A slice, including a plurality of macroblocks includes a slice header that has a quantization factor field that is associated to some of the macro blocks of the slice.

According to MPEG-2 the compressed elementary streams usually include a sequence of three types of frames. These types are known as I-frame, P-frame and B-frame. I-frames use only intra-coding. P-frames use forward prediction and usually also intra-coding. B-frames use bi-directional coding (forward and/or backward prediction) and optionally also intra-coding. In a sequence of I, P, and B-frames, each P-frame is encoded in view of a previous I-frame or P-frame. Each B-frame is coded using a previous I-frame of P-frame and/or a next I-frame or P-frame.

An MPEG-2 recognizable frame can be reconstructed from an I-frame alone, but not from a B-frame alone. Only I-frames and P-frames can be anchor frames that are used to predict other frames. I-frames allow for reconstructing a recognizable frame but offers only relatively moderate compression. B-frames are usually much smaller than I-frames. Each frame includes a frame header that includes a frame type indication, indicating whether the frame is an I, B or P frame.

MPEG-2 Frames are sometimes arranged in groups that are referred to as Group Of Pictures (GOP). Usually, each GOP starts by an I-frame that is followed by B-frames and P-frames.

Transmission of Compressed Media Streams

After a video stream or an audio stream is compressed it is further packetized (and optionally multiplexed with other streams) to facilitate transmission over networks. MPEG-2 standard describes a transmission apparatus that receives video and audio elementary streams, packetizes these elementary streams to provide PES packets and then converts the PES packets to Transport Stream packets or Program Stream packets. Transport stream packets may be transmitted over a network or stored in a storage unit.

A Transport Stream combines one or more programs with one or more independent time bases into a single stream. Transport Streams include transport stream packets of 188 bytes. Transport Stream packets start with a transport stream packet header. The header includes a packet ID (ND). Transport Stream packets of one PID value carry data of a single elementary stream.

Transport Streams may be of either fixed or variable bit rate. Some programs of the Transport Stream are of a variable bit rate. A typical variable bit rate program can be generated by allocating more bits to complex scenes, and allocating less bits to more simple scenes.

Transport Streams are provided to a channel of a limited available bandwidth/storage space. The ISO/IEC 13818-1 specification defines a channel as a digital medium that stores or transports a Transport or a Program Stream. The aggregate bandwidth of all the components of the Transport Stream must not exceed, at any time, the available bandwidth allocated to the transmission of the transport stream over the channel.

Various lossy and lossless techniques are implemented to perform rate shaping. These techniques are also known as statistical multiplexing rate shaping. U.S. Pat. Nos. 6,038,256 and 6,192,083 of Linzer et al, U.S. Pat. Nos. 5,862,140 and 5,956,088 of Shen et al and U.S. Pat. No. 5,877,812 of Krause et al, describe some of these prior art methods. Lossless techniques usually do not require further compressing of media pictures. Lossless techniques usually involve altering the timing of transmission of transport packets. For example, lossless techniques may involve changing a transmission timing of media stream components by either delaying or advancing a transmission of transport packets. Lossy techniques involve additional compression, and are usually implemented whenever the appliance of lossless techniques is not feasible or does not provide sufficient results. The additional compression usually results in visual quality degradation. An apparatus and method for rate shaping statistical multiplexing is also described in U.S. Pat. No. 6,434,141 titled "Communication management apparatus and method" of Oz et al, which is incorporated herein by reference.

Conditional Access

In order to allow only specific viewers to watch transmitted streams, conditional access apparatuses and methods are utilized. Conditional access apparatuses may scramble information and/or encrypt them. Encryption keys are also sent to conditional access devices, such as those that are included within client devices, to enable decryption of the media streams. As an example, according to the MPEG-2 standard, each Transport packet is encrypted and/or scrambled either individually or in conjunction with other transport packets. Two bits are defined in the MPEG-2 Transport packet header as transport_scrambling_control bits. If the value of these two bits is different than '0' then the payload of the packet is scrambled. For convenience of explanation, the application refers to encryption while it applied mutatis mutandis to scrambling.

U.S. patent application number 2002/0196939 of Unger et al. titled "Decoding and decryption of partially encrypted information", U.S. patent application number 2003/0026423 titled "critical packet partial encryption", U.S. patent application 2003/0021412 of Candelore et al. titled "Partial encryption and PID mapping", and U.S. patent application 2003/0046686 of Candelore et al., titled "time division partial encryption" describe apparatuses and method for allowing coexistence of multiple conditional access encryption apparatuses that partially encrypt a television program. The methods and apparatuses duplicate packets to be encrypted to provide shadow packets that are assigned special PID values so that when an encrypting unit receives the media stream it is able to recognize those packets that are to be encrypted. These patent applications are incorporated herein by reference.

Multiplexing and Encrypted Streams

Statistical multiplexing rate shaping involves some level of decoding applied to the programs that form the Transport Stream. This, generally, requires stripping the MPEG Transport layer, manipulating the MPEG Video layer and then re-multiplexing the programs in MPEG Transport packets. These operations require that the statistical multiplexers are able to read the media streams or at least a portion of the media stream. Lossless techniques that alter the timing of transmission of transport packets may handle transport packets that include non-encrypted timing information. Lossy techniques usually compress the payload of a transport packet, thus require that the payload is not encrypted. Thus, in many cases, encrypted media streams cannot be rate shaped multiplexed at their encrypted form.

In many cases the media streams are encrypted before they reach the statistical multiplexer. This happens, for example, both with Video On Demand streams and with media streams arriving via satellite. Once the media streams are encrypted, statistical multiplexing rate-shaping requires decryption of the encrypted media streams, subject them to statistical multiplexing rate-shaping and then encrypt them. In many cases the statistical multiplexers are not provided with decryption keys, for various reasons including security related reasons. Thus, these statistical multiplexers are not able to decrypt the incoming encrypted streams. Even if the encryption keys are available to the statistical multiplexers the procedure of decrypting and encrypting is very complex, especially as advanced high security encryption algorithms are used.

There is a need to provide a method and an apparatus that facilitates both statistical multiplexing and conditional access.

SUMMARY OF THE INVENTION

The invention provides an electronically readable medium, an apparatus and a method for generating a multiplex of media streams, the apparatus and method are capable of receiving a set of media streams that includes first type media stream components and second type media stream components; applying a modification process that is not adapted to modify second type media stream components, such as to provide at least one modified first type media stream component; and providing a multiplex that includes second type media stream components, modified first type media stream components and any remaining non-modified first type media stream components.

According to an embodiment of the invention second type media stream components are encrypted in a manner that does not facilitate their modification by the modification process. It is noted that the modification scheme can change, and that the change may differ the criteria applied for selecting between first and second type media stream components, whereas the selection is followed by sending the first type media stream components to be modified.

According to an embodiment of the invention, the apparatus and method are capable of handling at least one media stream that includes first and second type media stream components. This at least one media stream is also represented by multiple representations (e.g., layers). The multiple layers can be generated by that apparatus or method, but this is not necessarily so.

According to various embodiments of the invention the multi layers may provide temporal scalability or spatial scalability, they can be generated by applying multiple quantization levels and/or by applying filtering or manipulation. Temporal scalability is known in the art and may include dropping portions of a media stream.

According to an embodiment of the invention an electronically readable medium, an apparatus and a method are capable of generating at least one control parameter in response to the modification process and use the at least one control parameter to determine how media streams shall be represented, modified, or encrypted.

According to yet further embodiments of the invention there are provided electronically readable medium, a method and an apparatus for partially encrypting a media stream that in turn is represented by a multiple layers.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION

For simplicity of explanation the following detailed description refers to second type media stream components. It is noted that when modification processes are applied to certain media stream components time shift may result in other media stream components. Hence, some media stream components may be treated as second type media stream components with regard to time shifting. For example, if timing constraints related to a media stream component are unknown due to scrambling or encryption (not necessarily of that specific component) then such a component can be treated as a second type media stream component with regard to time shifting modification. On the other hand if the size of the media stream components may be modified then media stream components that are scrambled or encrypted in a manner that does not allow size modifications (for example transport stream packets that have encrypted payloads) are treated as second type media stream components with regard to size modification.

The term "media stream components" is a sequence of signals that represents media related information. It may include video as well as audio data and may also include transport packets or other types of packets or frames.

Figure 1:
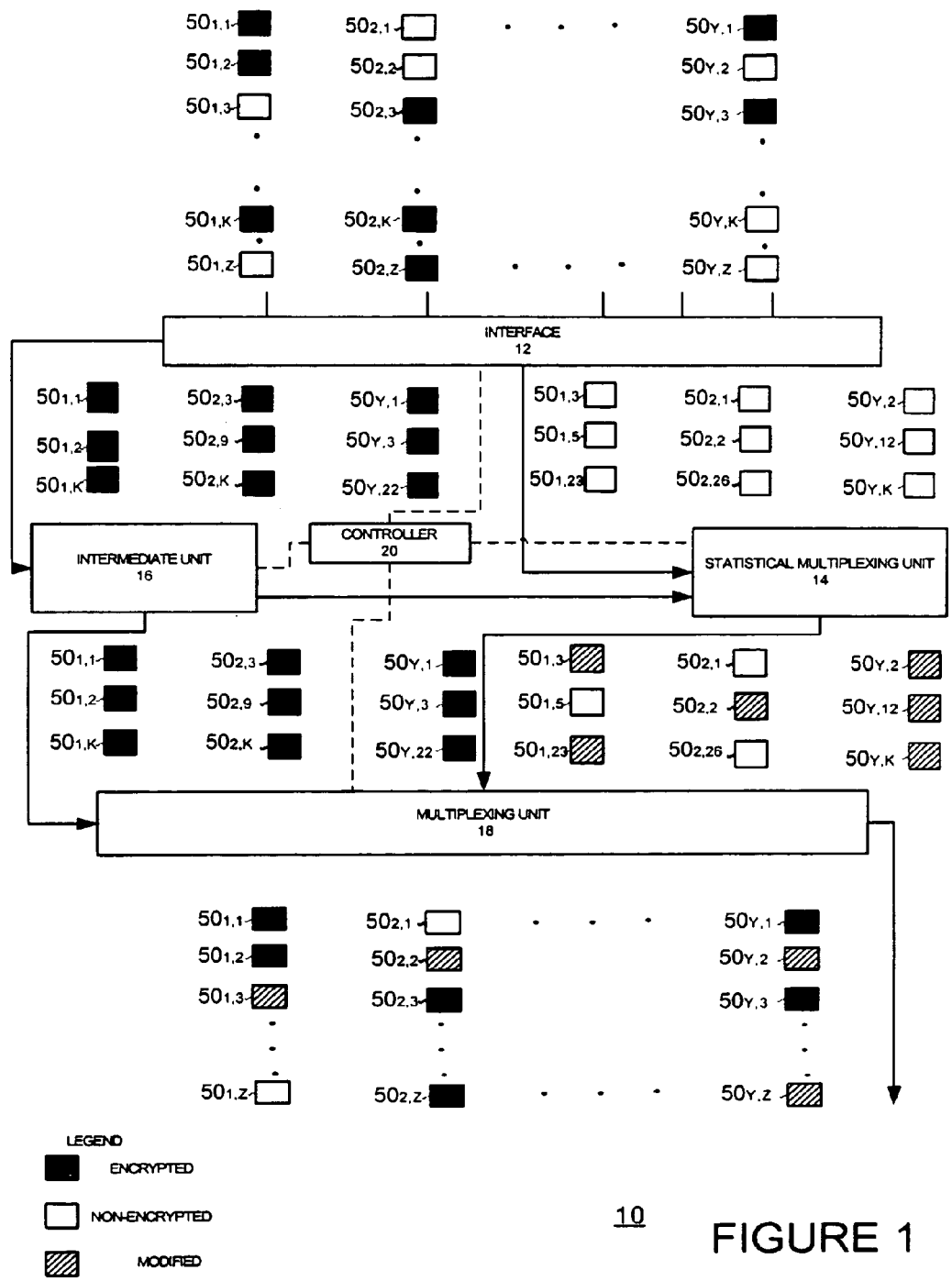
FIG. 1 illustrates an apparatus for generating a multiplex of media streams, according to an embodiment of the invention.

FIG. 1 illustrates an apparatus 10 for generating a multiplex of media streams, in accordance with an embodiment of the invention. For simplicity of explanation various components, such as storage units, voltage supply units, receivers and transmitters are not illustrated.

Apparatus 10 includes an interface 12, statistical multiplexing unit 14, multiplexing unit 18, an intermediate unit 16 and controller 20. The controller 20 is capable of controlling at least some of units 12-18 and may also participate in some processing tasks performed by apparatus 10. For example, controller 20 can execute an optional task of providing at least one control parameter in response to signals from unit 14, or other units.

The partial encryption may include partial encryption in manners known in the art. This includes the partial encryption schemes described in the mentioned above U.S. patent applications number 2002/0196939, 2003/0021412, 2003/0046686 and especially those described in U.S. patent application 2003/0026423, all being incorporated herein by reference.

These U.S. patent applications describe the following partial encryption schemes:(i) encrypting only audio streams, (ii) encrypting programs on a time division basis, (iii) encrypting N packets of a sequence of M packets whereas M>N, whereas M and N can be fixed, or can be given random pseudo-random or semi-random values; (iv) encrypting certain+video frames of a program; and (v) encrypting packets based upon their importance to a proper decoding of a program. The latter scheme can include encrypting only I-frames, encrypting "start of frame" transport stream packets that include PES headers or other headers, and the like.

According to other embodiments of the invention partial encryption of a media stream is possible when the media stream is represented by multiple layers. Partial encryption may involve encrypting one or more representation or layer, while not encrypting one or more other layers or representations.

According to various embodiments of the invention the multiple representations or layers may provide temporal scalability or spatial scalability, they can be generated by applying multiple quantization levels and/or by applying filtering or manipulation. Filtering can involve filtering a frequency domain transformation (such as discrete cosine transform) coefficients of a video stream.

Generating multiple representations of a media stream can include: (i) quantizing the media stream according to multiple quantization levels (Q scales) that differ from each other, to provide multiple quantized layers, and (ii) converting the multiple quantized layers to a base layer (the most coarsely quantized layer) and to at least one supplemental layer. Whereas supplemental layers are defined between each pair of consecutive quantized layers. An apparatus and method for providing a base layer and one or more supplemental layers is described at patent application Ser. No. 09/461,859, filed at Dec. 15, 1999, titled "method and apparatus for transmitting media streams over a variable bandwidth network", which is incorporated herein by reference. According to various embodiments of the invention one or more layers of the base layer and/or the supplemental layers are encrypted or partially encrypted, while one or more other layers are not.

According to yet another embodiment of the invention at least one media stream of the multiple media streams is processed to provide spatial resolution scalability. Thus, the media stream is represented by multiple layers that may be reconstructed to provide media stream of varying spatial resolution. A method for providing such a representation is described at U.S. Pat. No. 6,057,884 of Chen that is incorporated herein by reference. Partial encryption of such a media stream may involve encrypting only one or more layers while not encrypting another layer or other layers. Partial encryption may also involve encrypting a portion of at least one layer.

Interface 12 receives multiple media streams. Interface 12 may select a set of media streams out of said multiple media streams to be multiplexed, according to various parameters including viewers request, various policy rules and the like. FIG. 1 illustrates multiple (Y) partially encrypted media streams, but this is not necessarily so. In the figure all streams are partially encrypted. It is noted that more than a single media stream can be partially encrypted, and one or more media streams may be fully encrypted.

Interface 12 processes the received media streams components that form the media streams and determines which media components are encrypted and which are not. This determination may involve analyzing the media stream components, analyzing some of the media stream components or analyzing information associated with the media stream components. Some media stream components can even be dropped for various reasons, such as belonging to a media stream that will not form a part of the multiplexed output signal of apparatus 10.

The non-encrypted media stream components are sent to a statistical multiplexing unit 14 that has rate shaping capabilities.

Each media stream component may include an encryption indication, but multiple media stream components may be associated with a single encryption indication. For example, a MPEG-2 transport stream packet header includes transport_scrambling_control bits that indicate whether the transport stream packet includes encrypted information or not.

The statistical multiplexing unit 14 can modify the size and/or timing (perform time shifting) of non-encrypted components to provide smaller modified media stream components and/or time shifted modified or non-modified media stream components.

Statistical multiplexing unit 14 modifies non-encrypted media segments according to various parameters such as a bit rate limitation. The bit rate limitation usually reflects the amount of available bit rate for the transmission of the media streams.

For example, the modification may be responsive to a bit rate target that represent available bit rate for the transmission of the multiplex signal over a communication channel. The communication channel can be connected to end users, but this is not necessarily so as it can be a part of a distribution network. The multiplex may be further re-multiplexed and multiplexed until it reaches its destination.

In many cases the available bit rate for transmitting (or storing) the multiplex is constant, but this is not necessarily so. The available bit rate can fluctuate or vary over time.

Statistical multiplexing unit 14 may modify media stream components in response to various parameters and control schemes which may include supporting quality of service rules, allocating available bit rates to media streams according to the media stream transmission priority level, and the like.

Statistical multiplexing unit 14 outputs a multiplexed signal that is then re-multiplexed by multiplexing unit 18 with the encrypted media stream components from intermediate unit 16 such as to provide an output multiplexed stream.

According to another aspect of the invention, instead of performing a rate shaping statistical multiplexing by a first unit and then performing multiplexing by a second unit, both units or operations can be combined. For example, statistical multiplexing unit 14 can receive both encrypted and non-encrypted media stream, components and perform statistical multiplexing on both types, while not applying rate shaping techniques on the encrypted media stream components. Yet according to another example, the two units include a modifying unit that is controlled by a multiplexing unit.

The rate shaping process is applied in response to bit rate limitations that is responsive to the bit rate of the non-encrypted and encrypted media stream components.

The encrypted media stream components can be directly provided from interface 12 to multiplexing unit 18, can pass through an optional intermediate unit 16, and can even be sent to the statistical multiplexing unit 14 where they are not modified. Intermediate unit 16 may be adapted to provide the statistical multiplexing unit 14 an indication about the size and timing of the encrypted media stream components, but this is not necessarily so as the statistical multiplexing unit 14 may estimate the size or receive it from another source.

The modified non-encrypted media stream components as well those non-encrypted media stream components that were not modified and the encrypted media stream components are provided to multiplexing unit 18 that multiplexes these media stream components to provide an output multiplex.

According to an embodiment of the invention apparatus 10 operates in sessions. Even if it constantly receives media streams is operates on a group of media stream components basis. The group may include media stream components that are received during a certain time period, media stream components that are supposed to be transmitted during a certain time period, a group that includes a certain amount of media stream components and the like.

To allow such a group based operation the apparatus has buffering capabilities that are not illustrated for convenience of explanation.

Figure 2A:
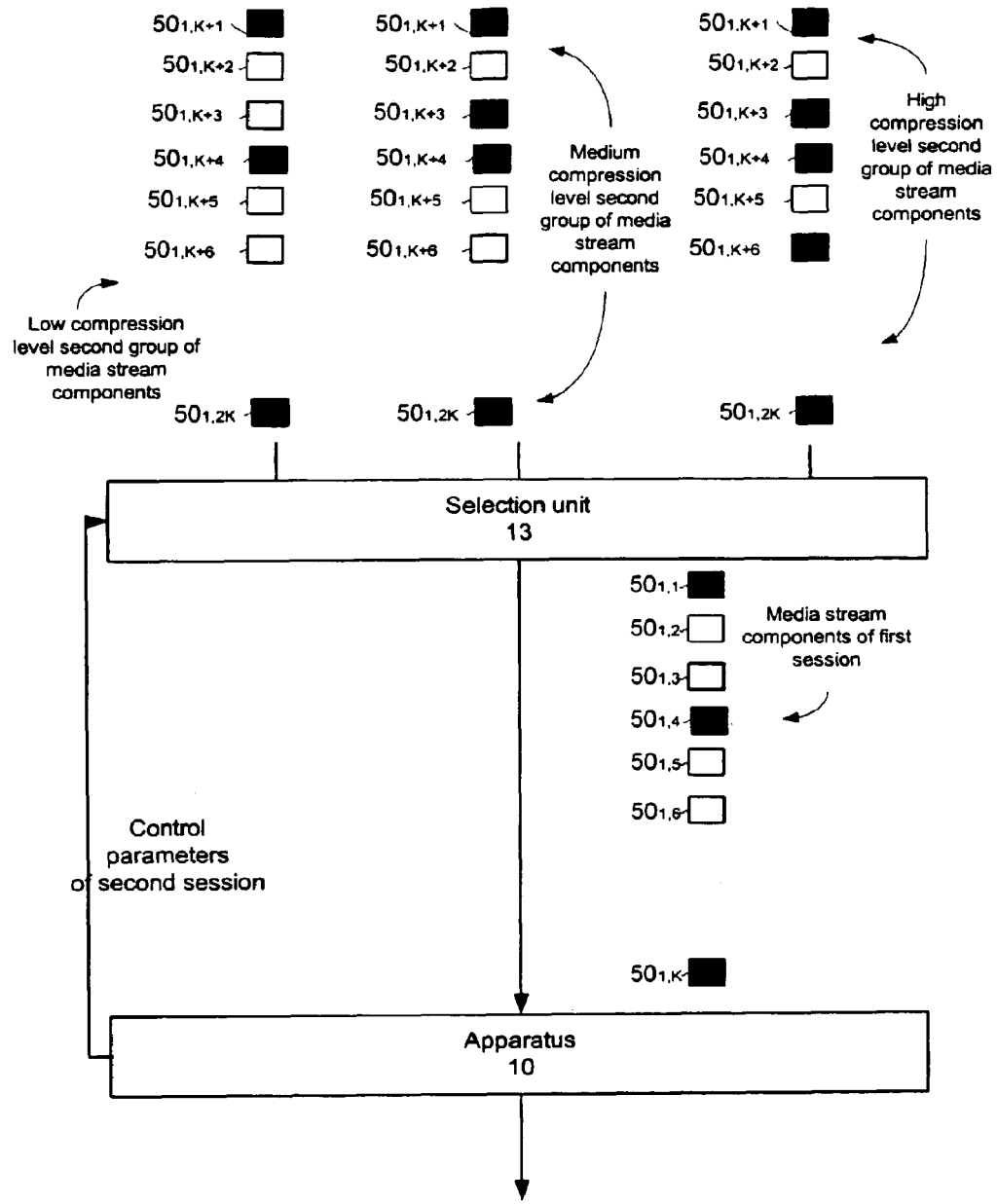
FIGS. 2a-2c illustrate apparatuses for generating a multiplex of media streams, according to some embodiments of the invention.
Figure 2B:
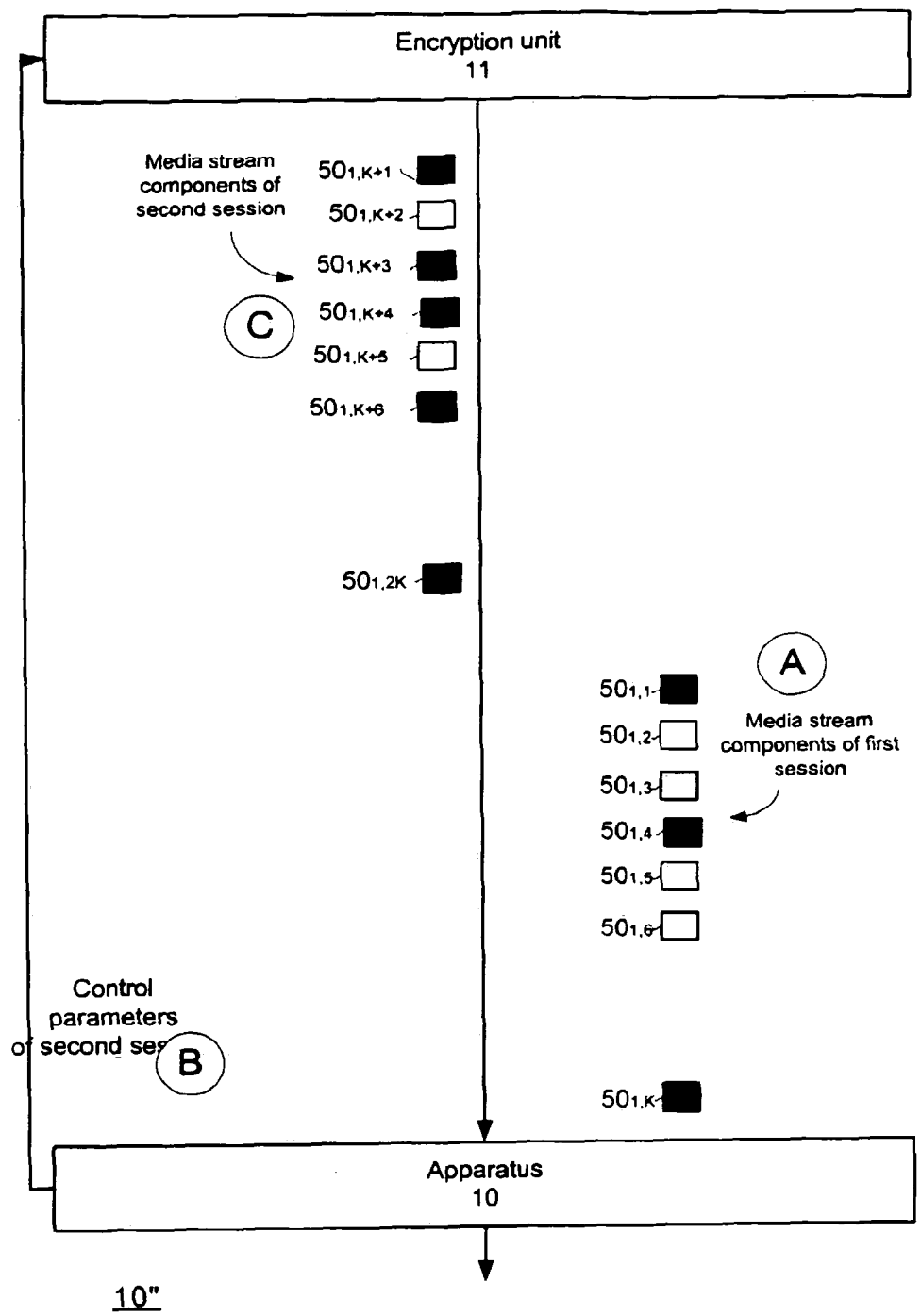

FIGS. 1, 2a and 2b provide an example of multiple media stream components that are processed by apparatus 10. It is noted that the amount and identity of media stream components per media stream, the amount of media streams, the size of each media stream component, the amount and identity of media stream components that are processed per modification session, the relationship between the various media stream components (encrypted, modified non-encrypted and non-modified non-encrypted media stream components) does not limit the scope of the invention. For example, these figures illustrate media streams that have the same amount (Z) of media streams components, that the modification process does not reduce the amount of media stream components and that same amount of media stream components (K) are processed per session. All these assumptions do not necessarily reflect real situations, and are used only to simplify the explanation. Furthermore, these examples do not describe time shifting of media stream components, while such a time shift can be implemented by unit 14.

Referring to FIG. 1, multiple media stream components are provided to interface 12. They include Y media streams, each including Z media stream components. The first media stream components of a first media stream is denoted $50_{1,1}$ and the last (e) media stream component of the last ($Y^{th}$) media stream is denoted $50_{Y,Z}$. It is further assumed that the media streams are partially encrypted. Encrypted media stream components are illustrated by full boxes while non-encrypted media stream components are illustrated by empty boxes.

Each session determines how to modify and multiplex a group of K media stream components from each media stream: $50_{1,1}$-$50_{1,K}$ ... $50_{Y,1}$-$50_{Y,K}$. These media stream components are associated with timing information and are supposed to be provided to a target decoder or processor during a certain time period.

It is also assumed that the target bit size, TBS, that is allocated to the group is already known or estimated.

While media streams components $50_{1,1}$-$50_{1,Z}$ ... $50_{Y,1}$-$50_{Y,Z}$ are received by interface 12 (or previously received and stored to be retrieved) only a portion of these media stream components are processed during a single session. Interface 12 analyzes the group of received media stream components to determine which are encrypted and which are not. The non-encrypted media stream packets of the group are sent to statistical multiplexing unit 14, while the encrypted media stream packets of the group are sent to intermediate unit 16 that determines the encrypted media stream component aggregate size ES and provides ES to the statistical multiplexing unit 14.

The rate shaping is responsive to bit rate limitations. For example, statistical multiplexing unit 14 can deduct the encrypted media stream component aggregate bit rate, ES, from the target bit rate TBS to determine the aggregate bit rate, NES, that can be allocated to non-encrypted media stream components. If NES is smaller or equal to TBS-ES then additional compression is not required. Else, statistical multiplexing unit 14 must further perform rate shaping operations.

The statistical multiplexing unit 14 may apply various statistical rate-shaping methods known in the art.

The statistical multiplexing unit 14 may also be responsive to modifications priorities assigned to media streams. Exemplary priority-based methods statistical multiplexing methods are described in U.S. patent application Ser. No. 09/870,069 titled "method and apparatus for prioritized bit rate conversion" filed 29 May 2001, U.S. patent application Ser. No. 09/870,056 titled "method and apparatus for comparison-based prioritized bit rate conversion" filed 29 May 2001, and U.S. patent application Ser. No. 10/011,341 titled "method for generating a multiplexed sequence of media units" filed 12 Nov. 2001, all being incorporated herein by reference.

By responding to modification priorities the statistical multiplexing unit 14 will modify high modification priority media stream components before modifying low priority media stream components are modified.

The statistical multiplexing unit 14 may modify media stream components more than once till it reaches the target bit size.

The statistical multiplexing unit 14 does not necessarily modify all the non-encrypted media stream components. It may output both modified media stream components (illustrated as partially filled boxes) as well as non-modified media stream components that were not modified during the modification process.

According to an embodiment of the invention indications of the modification process may be used to provide a feedback signal. This feedback signal represents at least one control parameter that may affect the encryption level of the media streams. An encryption level may reflect the security level of the media stream but in many cases it also affects the size of the encrypted media stream. If, for example, additional bit rate can be allocated for transmission of media streams then at least some of this additional bit rate can be used to encrypt more media stream components.

In deviation from encryption of MPEG-2 transport stream packets, the additional bit rate can also be used for encrypting media stream components with more size consuming encryption methods. This additional bit rate can be allocated on a priority level basis.

Referring to partial encryptions schemes described in U.S. patent application 2003/0026423, they can modified in the following manners: (i) if partial encryption involves encrypting only audio streams, then video may also be encrypted and/or the audio can be encrypted more extensively; (ii) if programs are encrypted on a time division basis, then lengthier portions of the programs may be encrypted; (iii) if N packets of a sequence of M packets are encrypted then N can be increased and/or M can be decreased; (iv) if certain MPEG video frames of a program are encrypted then more frames may be encrypted; and (v) if packets are encrypted based upon their importance to the video quality of a program then lesser important packets may be encrypted. For example, B-frames or P-frames can be encrypted in addition to the previously encrypted I-frames. Any combination of these schemes may also be implemented.

The allocation of additional bit rate for encryption (as encrypted media stream components are not modified) can be responsive to an encryption priority assigned to the media stream components. For example, high encryption priority media stream components may be encrypted, re-encrypted with another encryption scheme or even encrypted by more than a single encryption scheme before low encryption priority media stream components are encrypted.

It is noted that a single media stream can be encrypted in multiple manners, to allow decryption by various decryption apparatuses, including legacy conditional access apparatuses.

Figure 2C:
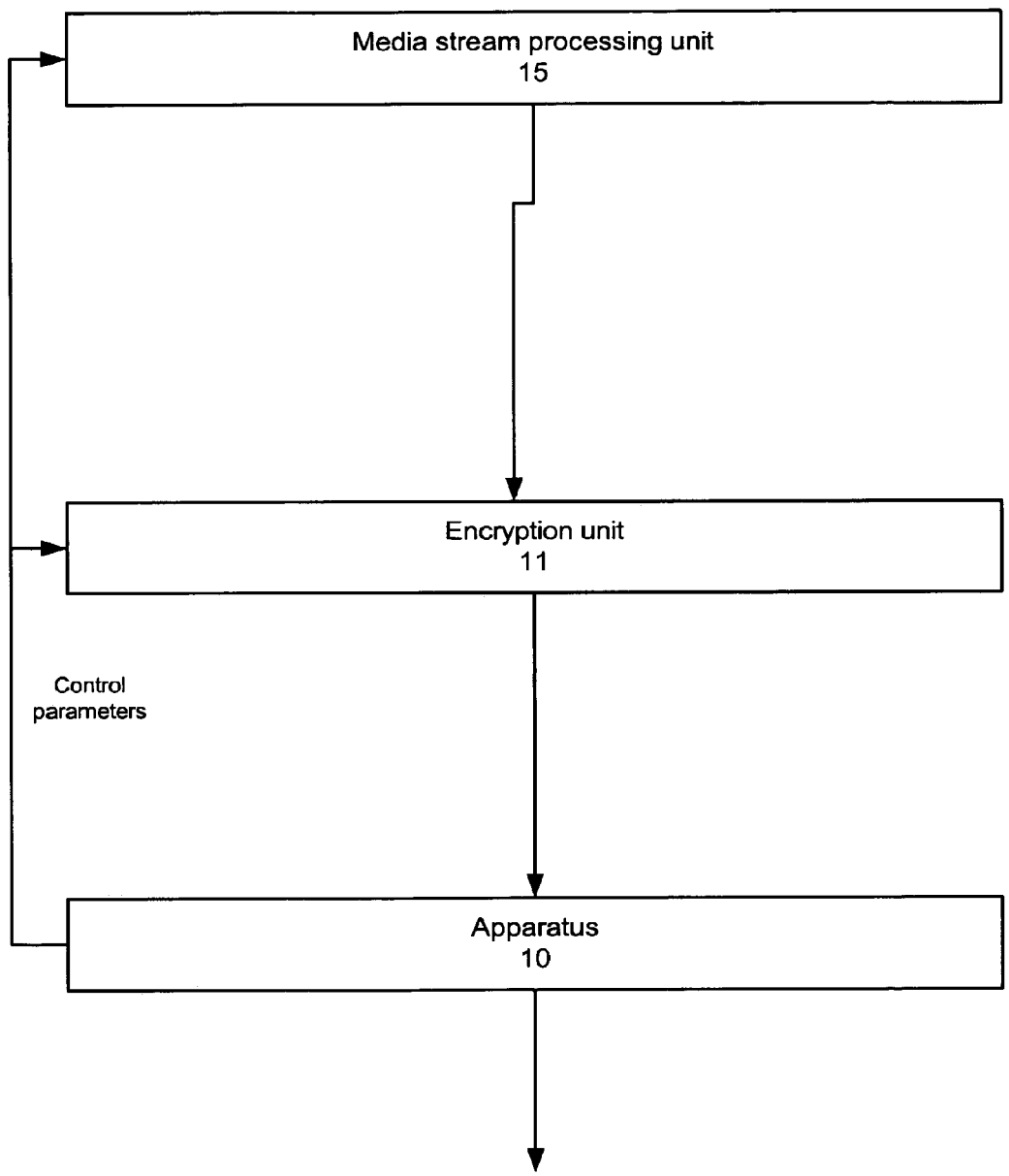

FIG. 2a-2c illustrate three embodiments in which apparatus 10 of FIG. 1 is connected to a selection unit 13, to an encrypting unit 11 or to a media stream processing unit 15. These figures illustrate a single media stream, for simplicity of explanation, although the apparatus is configured to process many media streams concurrently.

FIG. 2a illustrates apparatus 10 that is connected to selection unit 13. This figure illustrates a selection unit that has to select between three versions of media stream components (high, medium and low level encryption level) of a first session media stream components $50_{1,k+1}$-$50_{1,2k}$ in response to at least one control parameter that are determined after a first session media stream components $50_{1,1}$-$50_{1,k}$ are processed. The at least one control parameter may select between the versions or may be further processed before the selection is made. For example, the at least one control parameter may indicate LOW, MEDIUM or HIGH encryption, but may also reflect an available bit rate, that is compared to the size of the three versions before a selection is made.

FIG. 2b illustrates apparatus 10 that is connected to an encrypting unit 11. This figure illustrates a session based selection scheme in which media stream components $50_{1,1}$-$50_{1,k}$ are processed during a first session (denoted "A") and at least one control parameter for a second session is determined (denoted "B"). The figure illustrates an example where an increase in allocated bit rate facilitates generating second session media stream components $50_{1,k+1}$-$50_{1,2k}$ (denoted "C") that is more encrypted (for example—encrypted in a more secure method) then the first session media stream components sequence.

FIGS. 2a and 2b describe a method in which the at least one control parameter is updated on a modification session basis, but this is not necessarily so.

FIG. 2c illustrates an apparatus 10 that is connected to a media stream processing unit 15 and encrypting unit 11. The media stream processing unit 15 is capable of generating a base layer and multiple supplemental layers, and supplying at least one of the layers to the encrypting unit 11. The encrypting unit 11 encrypts at least a portion of one layer while not encrypting a portion of one or more other layers. The encryption unit 11 may have its own interface for receiving the media streams.

According to an embodiment of the invention the at least one control parameter is sent to a controlling unit (not shown) that controls the encrypting unit and/or to the media stream processing unit. The controlling unit may specify the PID of media stream components to be encrypted so that the encrypting unit is capable of recognizing which components to encrypt. The at least one control parameter may also be used to alter the representation of a media stream, such as to determine the amount of layers or the content of the layers.

According to an embodiment of the invention the media stream processing unit 15 may be adapted to provide multiple layers representative of the media stream. According to various embodiments of the invention media stream processing unit 15 may generate multiple layers such as to provide temporal scalability or spatial scalability, it may also generate layers by applying multiple quantization levels and/or by applying filtering or manipulation.

The media stream processing unit 15 may convert a media stream to provide multiple layers or even convert a first set of layers to a second set of layers.

According to an embodiment of the invention the media stream processing unit 15 is capable of quantizing a media stream according to multiple quantization levels to provide multiple quantized layers. The most coarsely quantized representation of the media stream is defined as a base layer. The media stream processing unit 15 is further adapted to produce a supplemental layer for each successive pair of said quantized layers.

The encrypting unit 11 may be adapted to encrypt at least a portion of a first layer (being a base layer or a supplemental layer).

According to another embodiment the media stream processing unit 15 is adapted to: (i) down-sample the media stream to provide a first spatial resolution layer; (ii) up-sample the first spatial resolution layer to provide a first reconstructed layer, and (iii) to produce a first enhancement layer that reflects the difference between the media stream and the first reconstructed layer. The encrypting unit 11 may be adapted to encrypt at least a portion of the first enhancement layer or at least a portion of the first spatial resolution layer. It is noted that spatial scalability is not limited to two layers, and that the media stream processing unit may provide more multiple spatial resolution layers and enhancement layers.

The encrypting unit 11 is adapted to encrypt at least a portion of an enhancement layer or at least a portion of the first spatial resolution layer.

According to yet a further aspect of the invention the partial encryption scheme can be altered (for example, by media stream processing unit 15) by changing the representation of a media stream in a multiple media stream representation scenario. For example, if additional bandwidth can be allocated to transmit a certain media stream then more layers of said stream may be transmitted. The transmission of more layers may result in a need to alter the encryption of the transmitted layers and/or may inherently change the encryption of the media stream as layers of differing encryptions are transmitted.

Figure 3:
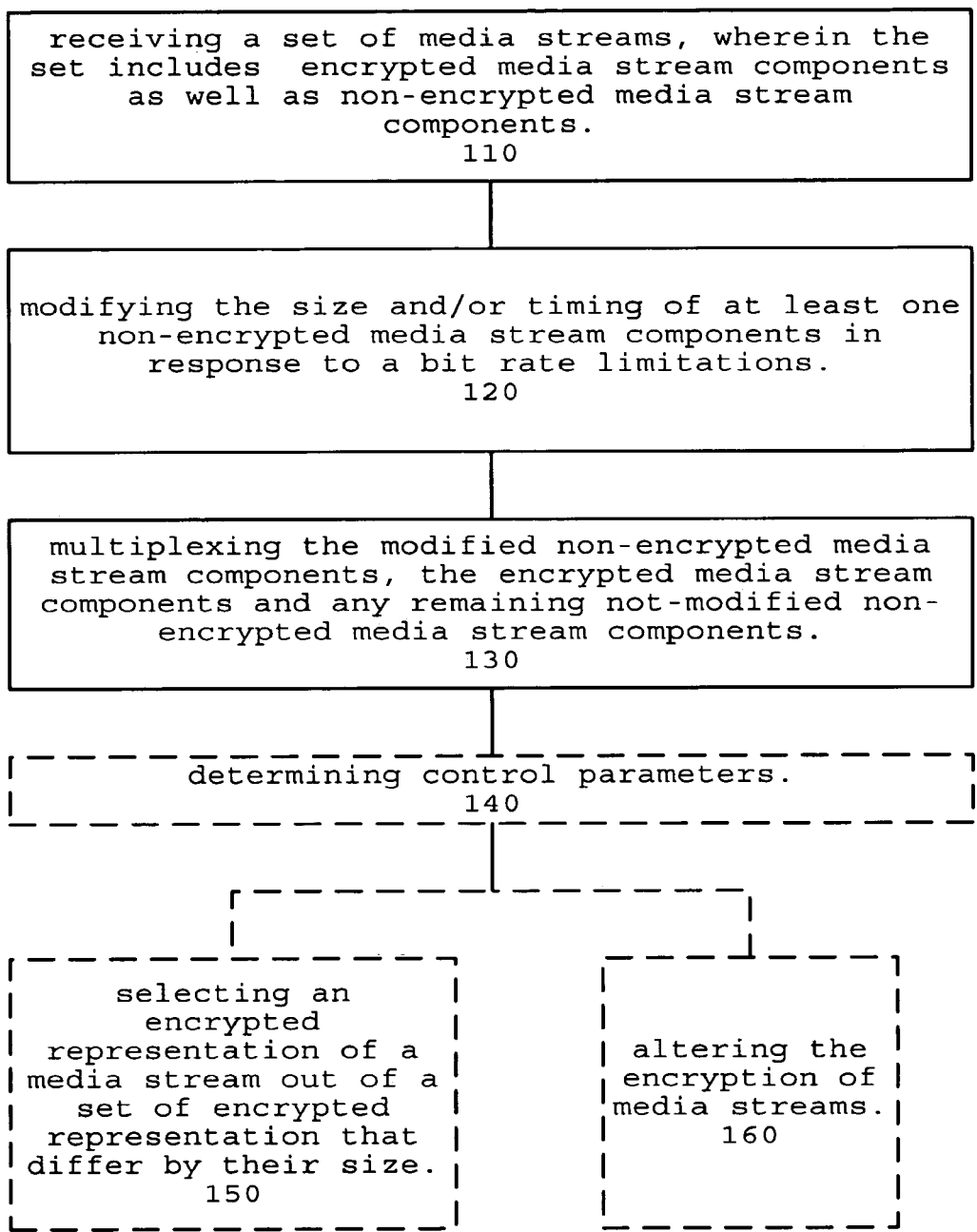
FIG. 3 is a flow chart of a method for generating a multiplex of media streams, according to other embodiments of the invention.

FIG. 3 is a flow chart of method 100 for generating a multiplex of media streams, the method includes step 110 of receiving a set of media streams, wherein the set includes first type media stream components and second type media stream components. The first type media stream component can be modified by a modification process of step 120, while the second type media stream can not be modified. For example, the second type can be encrypted media stream components that are encrypted such as to prevent size and/or timing modifications The former usually cannot be statistical multiplexed rate shaped while the latter cannot be statistical multiplexed.

Step 110 is followed by step 120 of applying a modification process that is not adapted to modify second type media stream components, such as to provide at least one modified first type media stream component. For example, the modification can include lossy compression and the second type media stream components can include encrypted media stream components.

Step 120 may include modifying the size and/or timing of the media stream components.

It is noted that the second type media stream components can be indirectly influenced by the modification of the first type media stream components. For example, by modifying the size of first type media stream components that are eventually multiplexed with the second type media stream components the timing of the second type can be altered. According to various embodiments of the invention the multiplex can be formed such as not to alter the timing of second type media stream components, such as by defining timing constraints that limit the allowed time shifting of second type media stream components.

According to an embodiment of the invention step 120 involves executing modification sessions in a periodical manner. Each modification session may be associated with a group of media stream portions that are either
(i) of a certain aggregate size, (ii) that are received during a certain time period, or (iii) are received during a certain time period. Usually, each modification session is responsive to a bit rate target that reflects available transmission bit rate during a certain time period. The bit rate target may be either provided or estimated. The modification session may also be responsive to media stream component modification priorities and even to an allocation of available bit rate per media stream component transmission priority. Conveniently, at least one modification session includes modifying the size/timing of at least one media stream component of the group, evaluating the size/timing of the at least one modified non-encrypted media stream component, and determining whether additional modification is required. The additional modification may involve modifying another non-encrypted media stream component of the group or re-modifying a modified media stream component of the group, or modifying the timing of encrypted components.

The modification is preceded by differentiating between encrypted media stream components and non-encrypted media stream components. This differentiation may be responsive to the presence of an encryption indication associated with one or more media stream components.

Step 120 is followed by step 130 of multiplexing the modified non-encrypted media stream components and the encrypted media stream components. If during step 120 some non-encrypted media stream components are not modified they are also multiplexed.

Step 130 may be followed by optional step 140 of determining at least one control parameter. This at least one control parameter may be applied to future media stream components—those who were not processed during the current modification session or even those who were not yet received. Step 140 may include determining an encrypted media stream component target bit rate. This determination can be responsive to various parameters such as: target bit rate, the bit rate of encrypted media stream components and of non-encrypted media stream components previously received during step 110.

Step 140 is followed by one of the following optional steps: step 150 of selecting an encrypted representation of a media stream out of a set of encrypted representations that differ by their size; and step 160 of altering an encryption parameter of media streams. Conveniently, steps 150 and 160 are followed by either step 120 or step 110.

According to an embodiment of the invention encryption priority may be assigned to media streams. Typically, if such priorities are defined then step 160 is responsive to the encryption priorities. Usually, step 160 of altering encryption parameters has greater meaning when statistical multiplexing rate shaping is applied and when the different encrypted versions differ by size.

Figure 4:
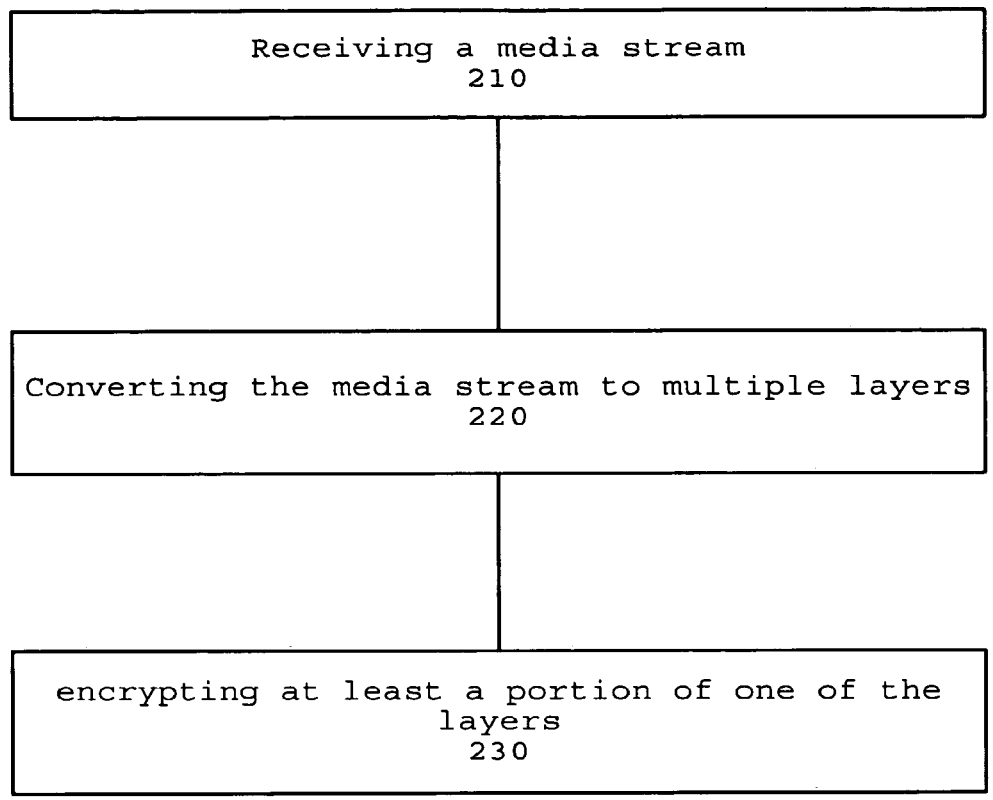
FIGS. 4-5 illustrate methods for partial encryption, according to embodiments of the invention.

FIG. 4 illustrates a method 200 for partial encryption, according to an aspect of the invention. Method 200 receives a media stream (step 210) and converts it to multiple layers during step 220. The conversion may provide temporal scalability or spatial scalability, and may include applying multiple quantization levels and/or by applying filtering or manipulation.

Step 220 is followed step 230 by encrypting at least a portion of one of the layers.

Figure 5:
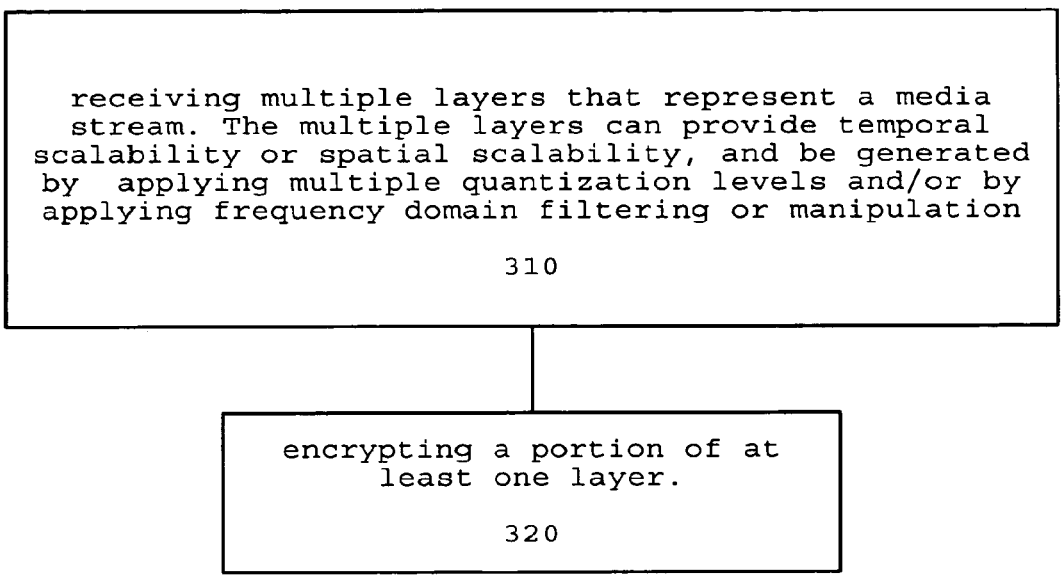

FIG. 5 illustrates a method 300 for partial encryption; according to an aspect of the invention. Method 300 starts by step 310 of receiving multiple layers that represent a media stream. The multiple layers can provide temporal scalability or spatial scalability, and be generated by applying multiple quantization levels and/or by applying filtering or manipulation. Step 310 is followed by step 320 of encrypting a portion of at least one layer.

According to an aspect of the invention a controller (referred to 20 in FIG. 1) may receive indications about the available bit rate as well as the bit rate of non-encrypted and encrypted media stream components and can balance between the modification manner of the non-encrypted media stream segments, encryption of media streams and the representation of a media stream. The controller 20 may be responsive to modification priorities, encryption priorities and additional policy rules relating to the generation and transmission of media stream representations. For example, conditional access media streams that are more significant to users can be slightly modified, highly encrypted and also be represented by more than a base layer.

The present invention can be practiced by employing conventional tools, methodology and components. Accordingly, the details of such tools, component and methodology are not set forth herein in detail. In the previous descriptions, numerous specific details (such as a certain compression standard) are set forth in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. In combination with other steps prior art fails to teach alone or in combination the limitations of applying a modification process that is not adapted to modify second type media stream components thereby providing at least one modified first type media stream component, wherein the modification process includes modifying a size of at least one media stream component of the group, evaluating the size of the at least one modified non-encrypted media stream component, and determining whether additional modification is required.

2. The method of claim 1 wherein the second type media stream packets are encrypted such as not to facilitate their modification.

3. The method of claim 1 wherein the modification process involves lossy compression.

4. The method of claim 1 wherein the modification process' involves lossless compression.

5. The method of claim 1 wherein the modification process involves altering a size of at least one media stream component.

6. The method of claim 1 wherein the modification process involves altering a timing of transmission of at least one media stream component.

7. The method of claim 1 wherein the step of multiplexing further comprises multiplexing non-modified first type media stream components.

8. The method of claim 1 wherein the step of modifying comprises executing modification sessions in a periodical manner.

9. The method of claim 8 wherein each modification session is associated with a group of media stream components that are received during a certain time period.

10. The method of claim 8 wherein each modification session is associated with media stream components of a certain aggregate size.

11. The method of claim 8 wherein each modification session is associated with a group of media stream components to be transmitted during a certain time period.

12. The method of claim 8 wherein each modifications session is associated with media streams components of the set of media streams that were not transmitted.

13. The method of claim 8 wherein at least one modification session includes modifying a timing of at least one media stream component of the group, evaluating the timing of the at least one modified non-encrypted media stream component, and determining whether additional modification is required.

14. The method of claim 12 wherein the additional modification comprises modifying a non-modified non-encrypted media stream component of the group or re-modifying a modified media stream component of the group.

15. The method of claim 1 wherein at least one media stream of the set is partially encrypted.

16. The method of claim 1 further comprising determining at least one control parameter.

17. The method of claim 16 wherein the determination is followed by selecting an encrypted version of a media stream out of multiple distinct encrypted versions.

18. The method of claim 17 wherein the distinct encrypted versions differ from each other by a parameter that is video quality, encryption level or size.

19. The method of claim 18 wherein the distinct encrypted versions differ from each other by the manner that they were generated.

* * * * *

UNITED STATES PATENT AND TRADEMARK OFFICE
CERTIFICATE OF CORRECTION

PATENT NO. : 8,953,646 B2  
APPLICATION NO. : 13/270877  
DATED : February 10, 2015  
INVENTOR(S) : Nery Strasman et al.

Page 1 of 1

It is certified that error appears in the above-identified patent and that said Letters Patent is hereby corrected as shown below:

In the Claims

Column 12, line 63 to Column 13, line 5, claim 1 should read as follows:

1. A method for generating a multiplex of media streams, the method comprising:
   receiving a set of media streams that comprises first type media stream components comprising non-encrypted components and second type media stream components comprising encrypted video components;
   applying a modification process that is not adapted to modify second type media stream components thereby providing at least one modified first type media stream component, wherein the modification process includes modifying a size of at least one media stream component of the group, evaluating the size of the at least one modified non-encrypted media stream component, and determining whether additional modification is required; and
   multiplexing at least the second type media stream components and the modified first type media stream components.

Signed and Sealed this  
Tenth Day of March, 2015

Michelle K. Lee  
*Deputy Director of the United States Patent and Trademark Office*